United States Patent [19]

Smith

[11] Patent Number: 5,400,034
[45] Date of Patent: Mar. 21, 1995

[54] DIGITAL PHASE LOCK DETECTOR

[76] Inventor: Kimble J. Smith, 401 S. Linden Ave., Decatur, Ill. 62522

[21] Appl. No.: 130,014

[22] Filed: Sep. 30, 1993

[51] Int. Cl.$^6$ .......................... G01S 7/03; G01S 7/285
[52] U.S. Cl. ...................................... 342/103; 342/115
[58] Field of Search ................. 342/103, 115, 99, 100, 342/101

[56] References Cited

U.S. PATENT DOCUMENTS

| | | | |
|---|---|---|---|
| 4,672,330 | 6/1987 | Floyd et al. | 331/4 |
| 4,724,437 | 2/1988 | Jones et al. | 342/101 |
| 5,034,748 | 7/1991 | Goedeke et al. | 342/99 |
| 5,233,351 | 8/1993 | Gregory et al. | 342/100 |
| 5,268,691 | 12/1993 | Murphy | 342/62 |
| 5,307,071 | 4/1994 | Arnold et al. | 342/103 |
| 5,311,190 | 5/1994 | Devendorf et al. | 342/157 |

*Primary Examiner*—John B. Sotomayor
*Attorney, Agent, or Firm*—Roger M. Fitz-Gerald

[57] ABSTRACT

A digital phase lock detector for determining the periods of an incoming signal for use in measuring rapidly and accurately the relative speed or velocity of vehicles according to the Doppler-radar principle includes a micro-controller based processor unit operated under a stored program to perform period determination. A bandpass filter is provided for generating a periodic signal which has a frequency which is varied in accordance with the velocity of the target vehicle in response to a difference Doppler signal. A comparator is responsive to the periodic signal for generating a rectangular pulse signal which is a digital representation of the periodic signal. The processor unit includes a microprocessor for determining the period of the pulse signal by integrating a number of consecutive cycles to produce a synthesized Doppler frequency signal having a frequency which is proportional to the velocity of the target vehicle. The bandpass filter is responsive to the synthesized Doppler frequency signal for varying the center frequency thereof to track the difference Doppler signal.

10 Claims, 5 Drawing Sheets

LINE 25  ONE PERIOD

LINE 27

LINE 29

LINE 31  2 TIMES PERIOD

LINE 33

LINE 35

DIGITAL PHASE LOCK DETECTOR

BACKGROUND OF THE INVENTION

1. Field of the Invention

This invention relates generally to phase-locked looped systems and more particularly, it relates to an improved digital phase lock detector having a microcontroller based processor unit for determining the period of an incoming signal for use in measuring rapidly and accurately the relative speed or velocity of a target vehicle according to the Doppler-radar principle.

2. Description of the Prior Art

As is generally known in navigational systems, radar (an acronym for Radio Detecting and Ranging) equipment has been used for many years. These conventional radar equipment make use of the known propagation rate of microwave energy to ascertain the distance from the radar unit to a target (i.e., the vehicle under observation). The distance is based upon the fact that it is proportional to the time for the microwave energy to propagate from a source (radar unit) to the target and for the resultant reflected energy to return.

In recent years, there have also been developed radar systems which are capable of determining the speed of the target even when either the target vehicle and/or radar unit is in motion. These prior art radar systems measure the relative velocity of the target and relies upon the frequency shift called "Doppler shift" which the microwave energy undergoes when it is reflected from the target having a relative velocity with respect to the source. The relative velocity is the approaching or receding speed of the target. For example, such applications include Doppler-type speed meters commonly employed by law enforcement personnel to monitor the relative velocity of motor vehicles in order to enforce highway speed limits.

In particular, an ultra-high frequency radar signal is radiated in these prior art radar systems toward the target vehicle under observation. When the transmitted radar signal comes into contact with the target vehicle, a portion of the transmitted Doppler wave is reflected back to the radar unit. Then, the reflected wave is received and mixed with a sample portion of the transmitted wave to measure the difference in frequency between the reflected signal and the transmitted radar signal. This frequency differential is caused by the relative motion of the target vehicle with respect to the radar unit and is proportional to the ground speed of the target vehicle. The amount of this frequency shift may be quite significant. For instance, in an X-band transmitter having a source frequency of 10.525 GHz the amount of shift is on the order of 31 Hz for each mile per hour of relative velocity.

Further, it is also generally known that the basic problem encountered in the detection of the Doppler return signal is due to its inaccuracy because of large noise levels being injected therein from energy reflected by extraneous moving objects and white noise. In an attempt to solve this problem, there have been employed in the prior art radar equipment phase-locked looped techniques which are useful where the accurate detection and measurement of the variable Doppler frequencies returned from or initiated by moving targets are required. The phase-locked loop (PLL) is essentially an oscillator whose frequency is locked onto one single frequency component of an incoming signal. A basic PLL system typically incorporates a voltage-controlled oscillator (VCO), a phase detector, and a low pass filter. The phase detector is utilized to compare the reference frequency of the VCO and the frequency of the incoming signal and provides an error voltage. This error voltage is usually delivered to the low pass filter and then applied to the input of the VCO. The frequency of the VCO is responsive to this error voltage so as to lock the output frequency and phase of the VCO onto the incoming signal.

These prior art Doppler radar systems utilizing the PLL techniques require a finite amount of time before the loop of the system settles on the reference frequency of the incoming signal. The frequency of the voltage-controlled oscillator must be either increased or decreased in order to match the Doppler incoming signal. The locked condition is achieved only when the output of the VCO is in phase with the incoming signal. Accordingly, they suffer from the disadvantage that the speed measurement calculations tend to be relatively long. Further, since these prior art systems were implemented using all analog and discrete digital circuitry to perform a complex function, they lack versatility and flexibility so as to adapt to change in the radar system or application.

A prior art search directed to the subject matter of this application in the U.S. Patent and Trademark Office revealed the following U.S. Letters Patent:

| | | |
|---|---|---|
| 3,271,767 | 4,172,256 | 4,600,889 |
| 3,713,149 | 4,276,548 | 4,626,857 |
| 3,715,751 | 4,321,602 | 4,672,330 |
| 3,728,723 | 4,335,383 | 4,724,437 |
| 3,885,238 | 4,359,734 | 4,788,547 |
| 4,021,804 | 4,429,309 | 5,034,748 |
| 4,072,947 | 4,510,463 | Re.31,851 |
| 4,159,475 | 4,599,618 | |

In U.S. Pat. No. 4,335,383 to Berry issued on Jun. 15, 1982, there is disclosed a moving doppler radar unit which separates the incoming Doppler signal into its respective frequency components by means of frequency translation techniques and fixed frequency filters. The received Doppler signal is frequency translated by a modulator 50 (FIG. 2) to a preselected reference frequency. The frequency translated platform speed and the target speed frequency components are then separated by means of a narrow band filter 54 and a bandpass filter 56. The separated frequency components are frequency translated downward by demodulators 74 and 76 so as to obtain the speed signals representative of the ground speed of the target and platform vehicles, respectively.

In U.S. Pat. No. 4,724,437 to Jones et al. issued on Feb. 9, 1988, there is disclosed a signal acquisition circuit for a missile guidance system which includes an adaptive phase lock loop APLL. The phase lock loop is comprised of a phase sensitive detector PSD1, a variable gain circuit VG1, a loop integrator LI1, and a voltage controlled variable frequency oscillator VCO. The APLL is responsive to incoming signals received from a target and will lock on to the frequency of the received signal. The bandwidth of the APLL is altered in dependence on the signal being received in order to distinguish between a valid target and noise.

In U.S. Pat. No. 4,159,475 to Andre et al. issued on Jun. 26, 1979, there is shown a phase lock system for use in a radar system which includes a variable controlled oscillator 166 (FIG. 2) which is locked in frequency and phase to a reference local oscillator 116 in a closed loop configuration.

In U.S. Pat. No. 4,172,256 to Pacozzi issued on Oct. 23, 1979, there is shown a circuit for speed measurement of vehicles according to the Doppler-radar principle wherein a Doppler-useful signal $S_N$ is evaluated in a computer RN to which such signal is infed by means of a threshold value switch SW. A single-sideband suppressed-carrier modulator SSB (FIG. 2) has its input side connected to receive the Doppler-useful signal and also a high-frequency signal $S_{HF}$ produced by a high-frequency oscillator HFO. The output side of the single-sideband modulator is connected with the input of a phase-locked loop PLL whose output signal is converted into the original frequency band of the Doppler signal by means of a demodulator DM. The output of the demodulator is fed to the input of the threshold value switch SW via a low-pass filter TPF defining the output of the discriminator DT.

In Reissued U.S. Pat. No. Re.31,851 dated Mar. 19, 1985, of U.S. Pat. No. 4,359,734 to Bachman, there is illustrated a signal processing system for processing an electrical velocity information signal in a velocity detecting system which includes a detector 10 for developing an electrical information signal having a characteristic that varies systematically with the object's velocity. A converter 30 is used to develop an oscillatory signal having a frequency which varies in accordance with the velocity information signal characteristic. A tracking filter having a phased-lock loop 41 is provided with a center frequency that varies with the oscillatory frequency for filtering all frequencies other than the center frequency. A signal generator is responsive to the frequency of the signal passed by the tracking filter for generating an output signal having a frequency which is a preset ratio relative to the center frequency. The signal generator is comprised of a voltage-controlled oscillator 50, a comparator 60, a charging/discharging circuit 70, a switching circuit 80, and a local oscillator 90. The output frequency from the signal generator has a frequency which represents the velocity of the object being detected.

In U.S. Pat. No. 4,276,548 to Lutz issued on Jun. 30, 1981, there is illustrated a meter for measuring the relative velocity of an object which is comprised of a microwave diplexer 12, a phased-locked loop 14, a lock detector and timer 16, a timer 18, a counter 20, a display 22, and an electronic switch 24. The diplexer 12 illuminates the object with a beam of microwave energy and develops from energy reflected from the object a difference signal having a frequency which is proportional to the relative velocity of the object. The phase-locked loop 14 synchronizes the frequency of an internal oscillator with that of the difference signal and generates a lock signal when synchronization is achieved. The lock detector and timer 16 together with the timer 18 is used to develop a reset signal from the lock signal a predetermined period after synchronization is achieved and a latch signal a predetermined period thereafter. The counter 20 counts the cycles of the internal oscillator which are developed after the occurrence of the reset signal until the occurrence of the latch signal so as to form a sum signal indicative of the relative velocity of the object. The display 22 is provided for displaying the sum signal.

The other patents listed above but not specifically discussed are believed to be of only general interest and to show the state of the art in phase-locked loop systems and their particular application in the field of radar equipment.

However, none of the prior art discussed above teach a digital phase lock detector system for determining the period of an incoming signal like that of the present invention which includes a micro-controller based processor unit operated under a stored program to perform period determination of the incoming signal. The processor unit determines the period of the incoming signal by comparing the difference between successive periods for the purposes of developing a lock condition. The present invention facilitates measuring rapidly and accurately the relative speed or velocity of the target according to the Doppler-radar principle. It represents significant improvements over the aforementioned patents discussed, which are hereby incorporated by reference.

SUMMARY OF THE INVENTION

Accordingly, it is a general object of the present invention to provide an improved digital phase lock detector for determining the period of an incoming signal which includes a micro-controller based processor unit operated under a stored program to perform the period determination.

It is an object of the present invention to provide an improved digital phase lock detector for use in a Doppler radar system for determining rapidly and accurately the relative speed of a target vehicle according to the Doppler-radar principle.

It is another object of the present invention to provide an improved digital phase lock detector for determining the speed of a target vehicle which is implemented with a reduced number of analog and discrete digital circuit components than has been traditionally available.

It is still another object of the present invention to provide a digital phase lock detector for use in a Doppler radar system for determining the speed of a target vehicle which includes a micro-controller based processor unit for period determination of the incoming signal by comparing the difference between successive periods.

In accordance with a preferred embodiment of the present invention, there is provided a digital phase lock loop detector for use in a Doppler radar system for determining the speed of a target vehicle. The radar system includes a detector for generating a difference Doppler signal having a frequency which is proportional to the velocity of the target vehicle. The digital phase lock loop detector is comprised of a bandpass filter, a comparator and a micro-controller based processor unit.

The bandpass filter is responsive to the difference signal for generating a periodic signal having a frequency which is varied in accordance with the velocity of the target vehicle. The bandpass filter has a variable center frequency. The comparator is responsive to the periodic signal for generating a rectangular pulse signal which is a digital representation of the periodic signal. The micro-controller based processor unit is operated under a stored program and is responsive to the pulse signal for determining the period of the pulse signal by integrating a number of consecutive cycles to produce a synchronized Doppler frequency signal having a frequency which is proportional to the velocity of the target vehicle. The bandpass filter is responsive to the synchronized Doppler frequency signal for varying the center frequency thereof to track the difference Doppler signal.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
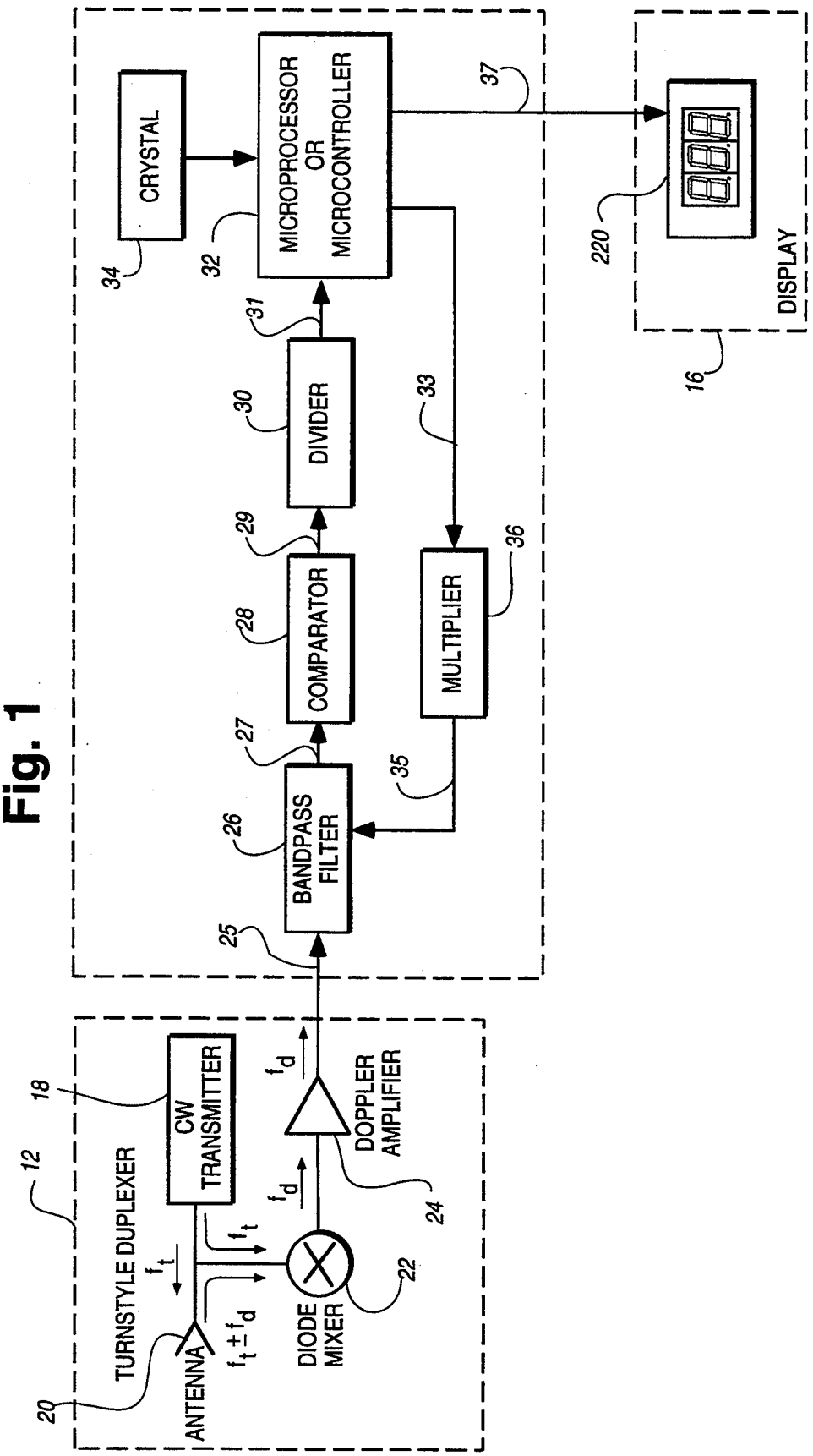
FIG. 1 is a simplified block diagram of a digital phase lock detector for use in a radar system, constructed in accordance with the principles of the present invention.

Referring now in detail to the drawings, there is shown in FIG. 1 an improved system 10, such as a Doppler radar system, for processing an electrical velocity information signal which is constructed in accordance with the principles of the present invention. The radar system 10 is comprised of a turnstile duplexer 12, a micro-controller based Doppler processor unit 14, and a display unit 16.

The Doppler radar system 10 measures the ground speed of moving objects (i.e., a target vehicle) by transmitting a beam of microwave energy and simultaneously receiving energy reflected back via the duplexer 12. The microwave energy when reflected back from the moving object exhibits a well-known scientific phenomenon which is called a Doppler shift. This Doppler shift is a shift in the frequency of the transmitted microwave energy due to: (1) the motion of the transmitter, (2) the motion of the target vehicle, or (3) the motion of both the transmitter and the target vehicle. Thus, the relative motion of the target vehicle produces a corresponding frequency shift in the reflected Doppler signal which is proportional to the speed of the target vehicle with respect to the transmitter. Detection of this frequency shift is done by the Doppler processor unit 14 so as to produce a synthesized Doppler frequency signal which is representative of the relative speed of the target vehicle. The speed of the target vehicle is then finally displayed visually on the display unit 16.

The turnstile duplexer 12 includes a continuous wave or CW type transmitter 18 which radiates continuously microwave energy with a frequency of $f_t$ via an antenna 20 with right-hand circular polarization. A major portion of the energy is radiated so as to form a beam that can be directed along the highway. A portion of the energy is used to bias a diode mixer 22. When a target vehicle enters the beam, a fraction of the energy illuminating the vehicle is reflected back to the antenna 20 where it is mixed in the diode mixer with the biasing energy.

It should be understood that this reflected energy has undergone a 180° phase shift and thus has reversed its polarization from the right-hand to the left-hand. While the antenna 20 collects the return energy, it is only the left-hand polarization energy that is directed to the mixer diode 22 through the turnstile. The function of the mixer diode 22 is to generate a new difference signal $f_d$ which has a frequency equal to the difference between the frequencies of the transmitted Doppler signal ($f_t$) and the received Doppler signal ($f_t + f_d$). The difference signal $f_d$ is proportional to the velocity of the target and is amplified by a Doppler amplifier 24 to an acceptable level before it is delivered to the processor unit 14. The turnstile duplexer 18 is preferably similar to one that is commercially available which operates on the so-called "X-band" energy (10.525 gigahertz).

The micro-controller based Doppler processor unit 14 is coupled via line 25 to the output of the Doppler amplifier 24 in the duplexer 12 and is responsive to the electrical velocity information signal (the difference Doppler shift signal). The processor unit 14 is comprised of a bandpass filter 26, a comparator 28, a divider circuit 30, a microprocessor or micro-controller 32, a crystal-controlled oscillator 34, and a multiplier circuit 36. Typically, the return Doppler shift signal $f_d$ is composed of a periodic signal and a substantial amount of noise. In order to reduce this noise and increase the system sensitivity, the return Doppler signal is fed initially to the bandpass filter 26 having moderately high-Q so as to effectively narrow its bandwidth. At the output of the bandpass filter on line 27, there is developed a sinusoidal signal having a frequency which varies in accordance with the velocity information signal or the difference Doppler shift signal.

The sinusoidal signal having a wide range of magnitude is fed to the comparator 28 which is effectively operated as a Schmitt trigger circuit such that it has relatively close maximum and minimum input switching ratios and a fast response time. Thus, the output of the comparator produces a rectangular pulse signal which is a digital representation of the sinusoidal input signal. The output of the comparator on line 29 is applied to the input of the divider circuit 30 for dividing the frequency of the pulse signal before it is sent to the micro-controller 32 via line 31.

The micro-controller 32 is operated under a stored program so as to determine the period of the digital or pulse signal and to integrate it with previous consecutive periods of the difference Doppler input signal in order to produce an integrated period. This integrated period is used to generate a synthesized Doppler frequency signal at the output of the micro-controller 32. The synthesized Doppler frequency signal is typically an integrated version of the return difference Doppler shift signal. This synthesized Doppler frequency signal is fed to the input of the multiplier circuit 36 via the line 33 which multiplies the frequency before it is applied to a clock input of the bandpass filter 26 via line 35 whose center frequency is determined by the ratio of 64-to-1. When the radar system is tracking the difference Doppler shift signal, any deviation of the frequency of the difference signal will cause a corresponding change in the center frequency in the bandpass filter 26. This change in the frequency from the setting allows the bandpass filter 26 to track the incoming Doppler signal. The micro-controller 32 also generates an output signal on line 37 which is fed to display unit 16 for displaying visually the speed of the target vehicle.

Figure 2:
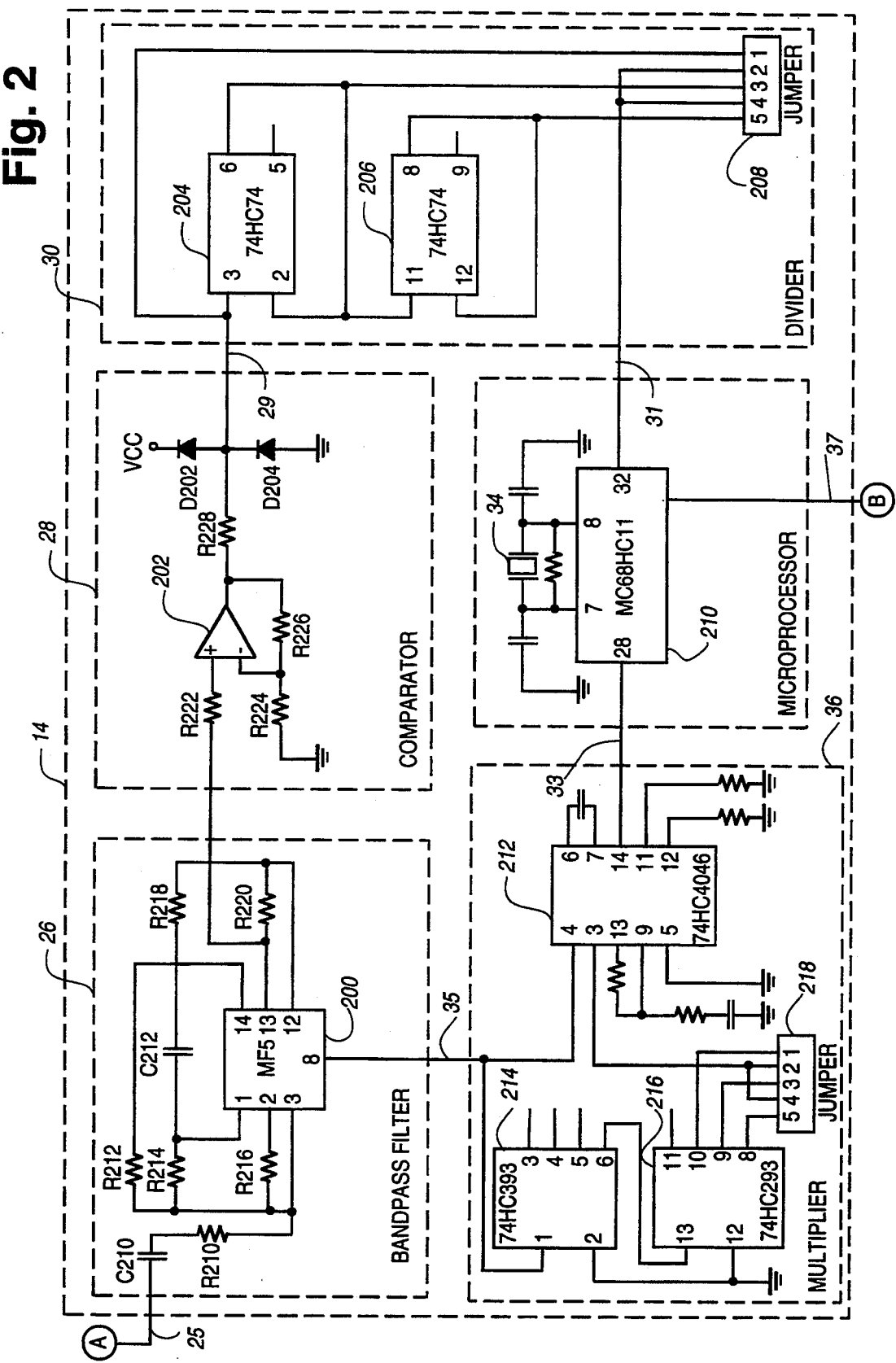
FIG. 2 is a more detailed circuit diagram of the digital phase lock detector of FIG. 1.

In FIG. 2, there is shown a detailed schematic circuit diagram of the micro-controller based Doppler processor unit or digital phase lock detector 14 of FIG. 1. Before the operation of the circuit of FIG. 2 is fully explained, it is important to point out by way of background that the basic principle governing the operational theory of continuous wave (CW) Doppler radar systems is set by the following equation:

$$F = (2v/c)F_t \quad (1)$$

where F is the Doppler frequency
$F_t$ is the transmitted frequency
v is the velocity of the target
c is the speed of light This is based on the assumption that the direction of travel of the target vehicle is coincident with the radar beam. For the X-band transmitter having a transmitting source frequency of 10.525 GHz, it can be determined from equation (1) above that a Doppler shift is produced and is on the order of 31.389 Hz for each mile per hour of relative velocity.

Further, it is generally also known that there is a constant number of Doppler cycles per unit of distance regardless of the velocity of the target vehicle. This can be shown by the following expression:

$$F_{cycles/ft} = F_{cycles/sec}/(1.466 ft/sec V_{mph}) \quad (2)$$

where $F_{cycles/ft}$ is the number of Doppler cycles in a unit of distance
F is the Doppler frequency
v is the target velocity Since F can be rewritten as 31.389 cycles/sec $v_{mph}$, this can be substituted into equation (2) then simplifies to:

$$\begin{aligned} F_{cycles/ft} &= 31.389_{cycles/sec} V_{mph}/(1.466 ft/sec V_{mph}) \\ &= 21.4_{cycles/ft} \end{aligned} \quad (3)$$

The operation of the digital phase lock detector 14 of FIG. 2 can be best appreciated by considering the system's performance when a test signal of 55 mph representing the speed of the target vehicle is applied as an input to the radar system 10. It will be assumed that the 55 mph signal with noise is received via the X-band transmission source having the frequency of 10.525 GHz. From equation (3) above, it can be determined that the 55 mph test signal will produce a Doppler shift of 1726 Hz.

A bandpass filter 26 is composed of an integrated circuit 200 in the form of an industrial standard switched capacitor filter MF5 or one-half of an industrial standard switched capacitor filter MF10. The pin numbers illustrated in the drawings are those applicable when this particular integrated circuit is employed for this purpose. This convention will be used when referring to the various integrated circuits described throughout this description of the preferred embodiment. However, it should be clearly understood that other integrated circuits could be employed for these purposes for which the various integrated circuits described herein are used.

Figure 3A:
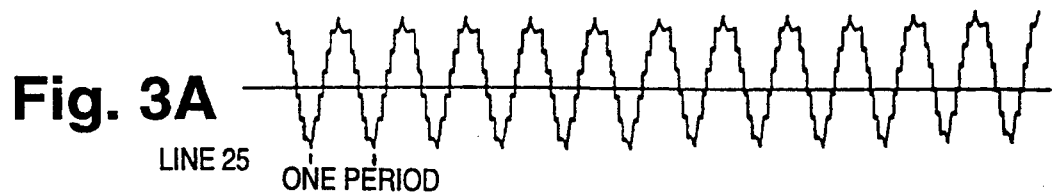
FIGS. 3(A)-3(F) show the waveforms at various points in the diagrams of FIGS. 1 and 2, which are useful in explaining and understanding the operation of the present invention.
Figure 3B:
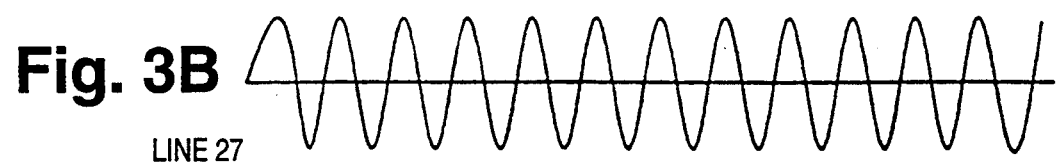

The bandpass filter further includes resistors R210, R212, R214, R216, R218, R220 and capacitors C210 and C212 which are used to effect programing of various parameters such as "Q," center frequency and gain. The center frequency is set to a ratio of 64-to-1 and is controlled via an external clock which is applied to clock input pin-8. In other words, the center frequency of the bandpass filter 26 is set to 1/64th of the frequency of the input clock. The "Q" of the bandpass filter is set to approximately 10 and the gain thereof is set to unity. A unity gain integrator is provided at the output of the bandpass filter in order to filter out unwanted clock feedthrough from the difference Doppler signal received on the input of the bandpass filter. For the 55 mph test signal example, the input clock will have a frequency of 64 times 1726 or 110,464 Hz. The difference Doppler signal is the return Doppler shift signal which is composed of a periodic signal and substantial amount of noise. This is illustrated in the waveform of FIG. 3(a) of the drawings. The output of the bandpass filter is a noise-free periodic signal which is depicted in the waveform of FIG. 3(b).

Figure 3C:
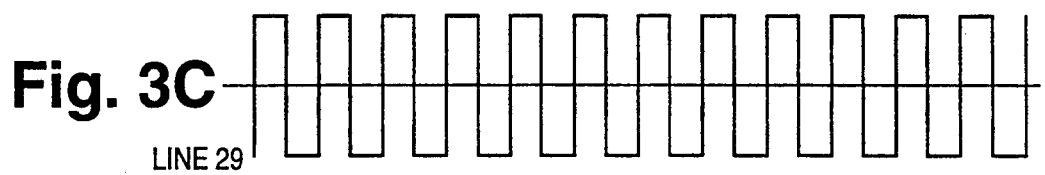

The comparator 28 functioning as the Schmitt trigger is comprised of an operational amplifier 202; resistors R222, R224, R226, R228; and clamping diodes D202, D204. The sinusoidal signal from the bandpass filter is fed to the inverting input of the operational amplifier 202 via the input resistor R222. The operational amplifier is provided with hysteresis to eliminate response due to unwanted noise. The output of the operational amplifier is coupled via the output resistor R228 to the line 29 which is delivered to the divider circuit 30. The output of the operational amplifier provides the rectangular pulse signal which is the digital representation of the sinusoidal signal and is shown in FIG. 3(c).

Figure 3D:
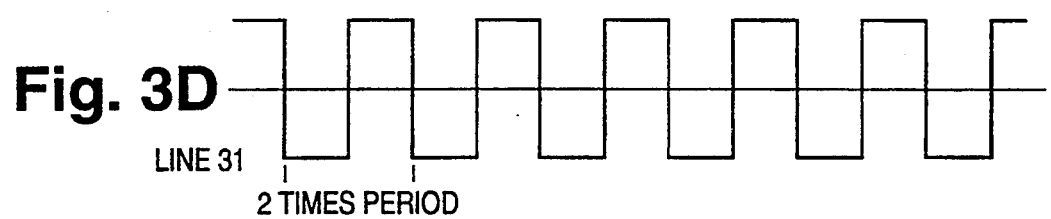

The divider circuit 30 is comprised of integrated circuits 204, 206 which is a dual D-type flip-flop such as 74HC74 manufactured by Harris Corporation. The flip-flop can be selectively connected by a user programmable network 208 to produce a division rate of 1, 2 and 4. In this example, the network 208 is connected to perform a divide-by-two. Thus, the output of the divider circuit has a frequency of 863 Hz and is illustrated in FIG. 3(d).

The integrated circuit 210 corresponds to the micro-controller 32 (FIG. 1) and is preferably an 8-bit micro-controller type MC68HC11 manufactured and sold by Motorola Corporation. The micro-controller is coupled to the output of the divider circuit 30 via its input pin-32 and performs the functions of period determination, frequency generation and displaying the speed of the target vehicle. The micro-controller 210 is responsive to the output of the divider circuit 30 and will generate the synthesized Doppler frequency signal that is representative of the difference Doppler shift signal. The micro-controller in conjunction with the crystal-controlled oscillator 34 will transform the pulse signal received on its input pin-32 into binary numbers representing the period or duration of the input signal. In other words, the longer the duration of the period, the higher will be the count of the binary numbers.

Figure 3E:
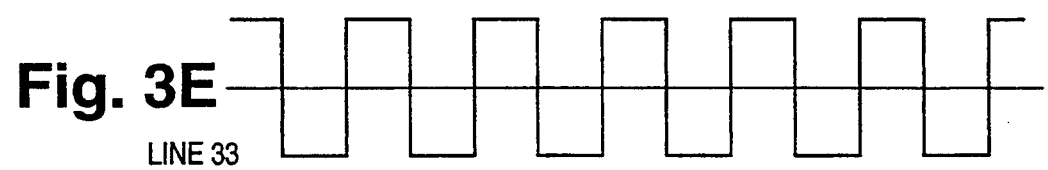
Figure 3F:
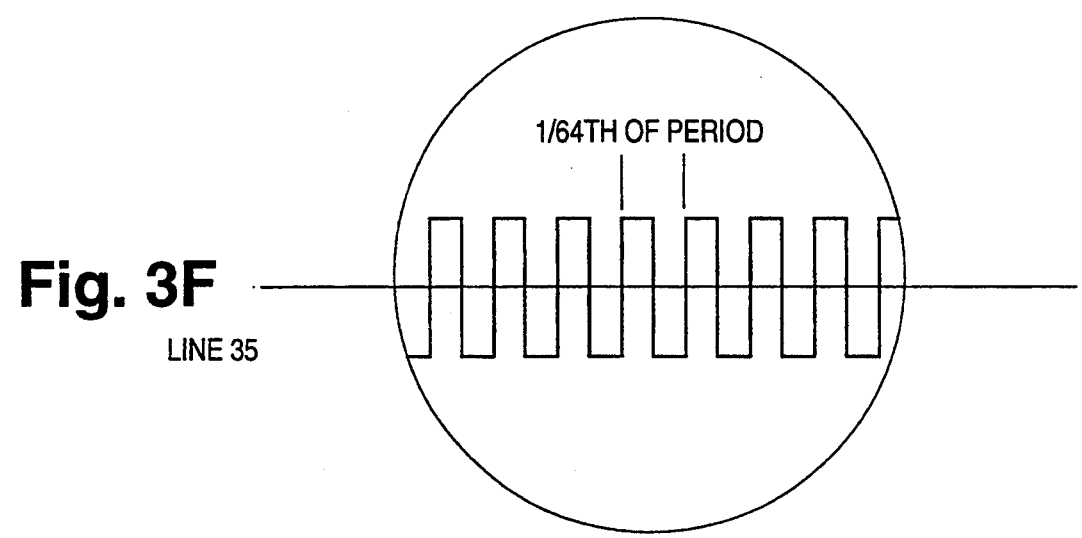

In this example, the input signal having the frequency of 863 Hz will be counted by the crystal-controlled oscillator having a frequency of 2 MHz so as to provide a period of 2317 counts. This value of the period is integrated with previous consecutive counts so as to produce an integrated value of 2317. The micro-controller will use directly this integrated value to generate the synthesized Doppler signal having a frequency of 863 Hz. The output of the micro-controller 210 is illustrated in FIG. 3(e).

The micro-controller is operated under the stored programs so as to scan the bandpass filter through a predetermined range of frequencies and locks onto the strongest frequency component by comparing the difference between successive counts. At each frequency, the micro-controller determines the periodicity of the incoming signal based upon its repetitiveness within a certain margin. If this occurs, a locked condition is obtained. Otherwise, the micro-controller will continue to scan the bandpass filter in order to locate a signal that fits the lock condition. In other words, the lock condition is achieved when a predetermined number of consecutive cycles of the received signal are in phase. Once the lock condition is determined, the micro-controller will calculate the speed from this period.

The multiplier circuit 36 is comprised of a phase lock loop integrated circuit 212 and is preferably similar to 74HC4046 manufactured by Harris Corporation. The multiplier circuit also includes dual 4-bit counter integrated circuits 214, 216 which is similar to Harris type 74HC393 and a user programmable network 218. The multiplier circuit can be selectively connected by the network 218 so as to produce a multiplier rate of 64,128 and 256. In this example again, the signal having the frequency of 863 Hz is multiplied by a factor of 128 so as to produce the external input clock having a frequency of 110,464 Hz, which is depicted in FIG. 3 ($f$). This external input clock is applied to the input pin-8 of the bandpass filter 26 to place the filter at the frequency of 110,464 Hz/64 or 1726 Hz. This is precisely the location of the original input signal.

Referring back again to FIG. 1, the display unit 16 is preferably formed of three 7-segment display devices 220 of the type which are quite conventional in the art. Display unit 16 is serially connected to the micro-controller via the line 37 where the operation thereof is totally controlled by the micro-controller. The display unit 16 is provided so as to permit the user of the radar system to observe visually the measured speed of the target vehicle.

Figure 4A:
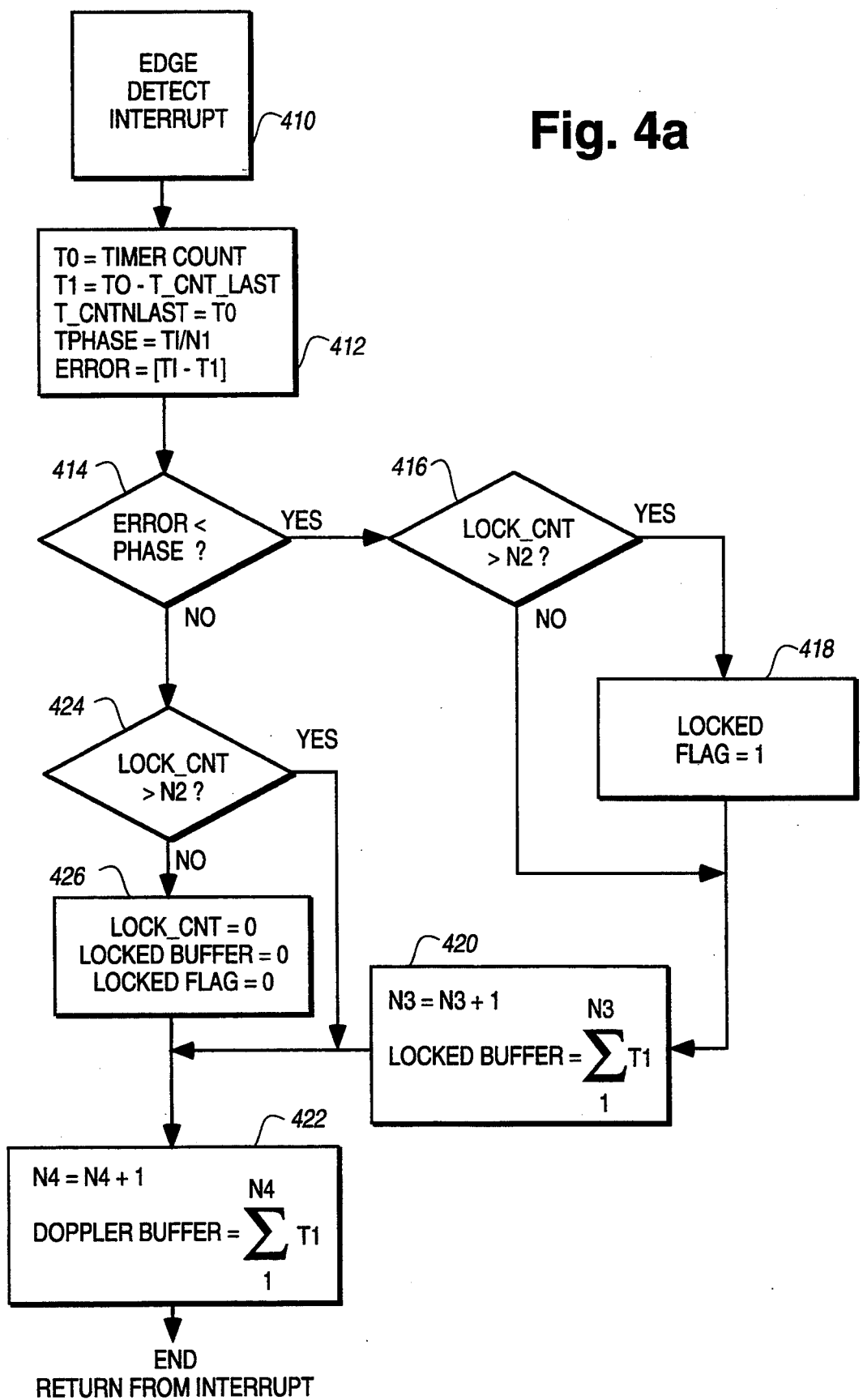
FIGS. 4a and 4b are flowcharts of the operational sequence of the micro-controller in the digital phase lock detector of the present invention for period determination, frequency generation and display functions.
Figure 4B:
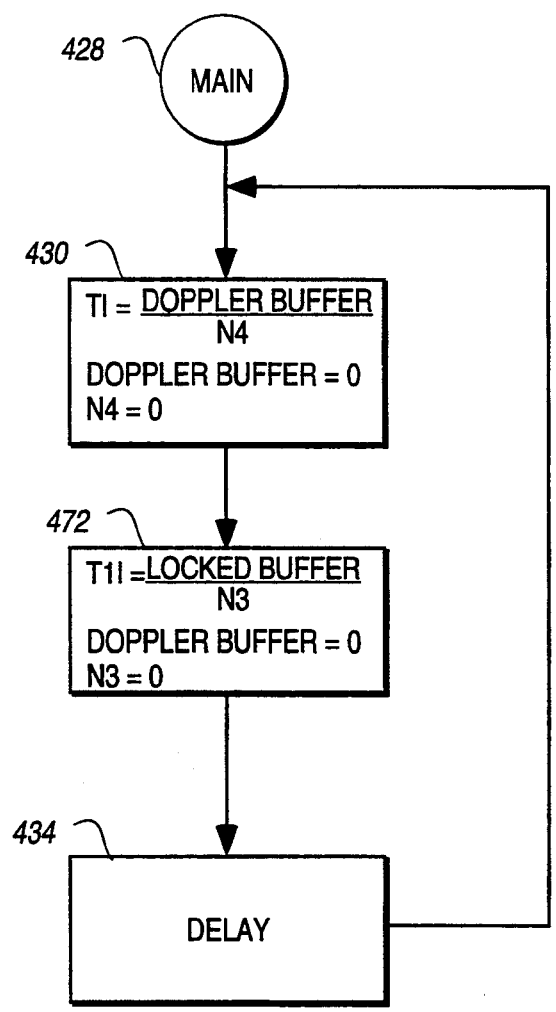

In FIGS. 4a and 4b, there are shown flow charts of the operational sequence formed by the micro-controller 32 in the processor unit 14 lander the control of the stored software program for period determination of the return Doppler shift signal. In this figure the following legends have the following meanings:

T0= CURRENT TIMER COUNT
T1= CURRENT DOPPLER PERIOD
TI= CURRENT AVERAGED DOPPLER
N1= ALLOWABLE PHASE ERROR i.e.

$N1 = 4 => 90$ DEGREES
$= 8 => 45$ DEGREES
$= 16 => 22.5$ DEGREES

N2= REQUIRED NUMBER OF LOCKED DOPPLER CYCLES
N3= NUMBER OF LOCKED DOPPLER CYCLES
N4= NUMBER OF DOPPLER CYCLES TO BE INTEGRATED
TPHASE= ALLOWABLE PHASE ERROR
ERROR= PHASE ERROR BETWEEN AVERAGED DOPPLER CYCLES AND CURRENT DOPPLER CYCLES
LOCK_CNT= CURRENT NUMBER OF LOCKED DOPPLER CYCLES
LOCKED BUFFER= TOTAL SUM OF LOCKED DOPPLER CYCLES
DOPPLER BUFFER= TOTAL SUM OF DOPPLER CYCLES.

In FIG. 4a, a digital representation of the return Doppler shift signal whose period is to be detected is sent to an edge detect interrupt block 410. In the block 410, the period of the return Doppler shift signal is transformed to a digital or binary word with a resolution which is dependent upon the length of an internal digital word and the frequency of the reference crystal-controlled oscillator 34. The digital word from the block 410 is then passed to a counter block 412 where the current count T0 of the number of cycles as controlled by the timer and the current Doppler period T1 are calculated. In addition, there is also calculated the allowable phase error TPHASE and the phase error ERROR between the averaged Doppler cycle and the current Doppler cycle.

In decision block 414, the phase error ERROR is compared with the allowable phase error TPHASE. If the phase error ERROR is less than the allowable phase error TPHASE, then the block 416 is reached where it is determined if the current number of locked Doppler cycles LOCK CNT is greater than a predetermined required number N2 of locked Doppler cycles. If the answer is yes, the locked flag is set to 1 in the block 418 and is then sent to locked buffer block 420 where the total sum of locked Doppler cycles is calculated. On the other hand, if the answer is no from the decision block 416, then the locked buffer block 420 is reached directly. From the block 420, there is reached a Doppler buffer block 422 where it is determined the total sum of Doppler cycles to be integrated.

On the other hand, if the phase error ERROR is greater than the allowable phase error TPHASE as determined from the block 414, then a decision block 424 is reached, which is identical to the block 416, where it is determined if the current number of locked Doppler cycles LOCK CNT is greater than a predetermined required number N2 (i.e., 2 to 255) of locked Doppler cycles. The number N2 is chosen by the user of the radar unit. If a faster response time is desired, the number N2 will be made smaller. On the other hand, if a higher accuracy or validation is needed, then the number N2 will be made larger. For example, in practice it has been found that the number N2 being set equal to 10 provides a suitable performance in most law enforcement applications. If the answer is yes, the Doppler buffer 422 is reached. If the answer is no, then a block 426 is reached where the current number of locked Doppler cycles, the total sum of locked Doppler cycles and the locked flag are all reset to zero before the Doppler buffer 422 is reached.

In FIG. 4b, the sequence begins in the block 428. In this figure the following legends have the following meanings:

TI= CURRENT AVERAGED DOPPLER
DOPPLER BUFFER= TOTAL SUM OF DOPPLER CYCLES
N4= NUMBER OF DOPPLER CYCLES TO BE INTEGRATED
TlI— INTEGRATED LOCKED DOPPLER CYCLES
LOCKED BUFFER= TOTAL SUM OF LOCKED DOPPLER CYCLES
N3= NUMBER OF LOCKED DOPPLER CYCLES

In the block 430, a current averaged Doppler TI is calculated based upon the information from the block 422 of FIG. 4a. Further, in the block 432 the integrated locked Doppler cycles T1I is determined by the information from the block 420 of FIG. 4a. After a delay from the block 434, the processes in the blocks 430 and 432 are repeated.

In the prior art radar systems which utilize a phased locked loop to extract and track the variable Doppler signals, there is required a finite interval of time before the loop of the system settles on a frequency of the reference input signal. In other words, the voltage-controlled oscillator used in the phase-locked loop must be either increased or decreased in order to match the Doppler signal. A "lock on" condition thus occurs only when the voltage-controlled oscillator is in phase with the reference input signal. Unlike the prior art which uses a fixed clock to count the number of Doppler counts in a certain fixed time, the digital phase lock detector or processor unit 14 of the present invention uses a fixed clock to determine the duration (period) of the input signals. Accordingly, the digital phase lock detector of the present invention is not time dependent and is dependent only upon distance. Since each Doppler cycle is calculated by the micro-controller 32, the speed calculation may be determined more rapidly and accurately where the target has travelled only ½ inch, thereby reducing substantially the amount of time needed for speed determination over those systems traditionally available.

Further, since the tracking function performed by the prior art systems necessitated the use of very complicated and expensive circuitry, the present invention has the advantage of being less costly. Because the period determination of the Doppler signal is accomplished by the micro-controller operated under the stored program, there is provided a large amount of versatility and flexibility to change and design parameters or different applications by changes in software only. Moreover, due to the fact that the bandwidth of the micro-controller based processor is dependent only upon the crystal-controlled clock frequency and the length of the digital word used in the micro-controller, higher resolutions can be easily obtained by simply increasing the frequency of the crystal-controlled clock or utilizing a microprocessor having a greater word size.

From the foregoing detailed description, it can thus be seen that the present invention provides an improved digital phase lock detector for use in a Doppler radar system for determining the speed of a target vehicle. The phase lock detector includes a micro-controller operated under a stored program to perform period determination of the incoming signal in a rapid and accurate manner.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A digital phase lock detector for use in a Doppler radar system for determining the speed of a target vehicle, said radar system including detector means for generating a difference Doppler signal having a frequency which is proportional to the velocity of the target vehicle, said digital phase lock detector comprising:

bandpass filter means responsive to said difference signal for generating a periodic signal having a frequency which is varied in accordance with the velocity of the target vehicle, said bandpass filter means having a variable center frequency;

comparator means responsive to said periodic signal for generating a rectangular pulse signal which is a digital representation of said periodic signal;

controller means operated under a stored program and being responsive to said pulse signal for determining the period of said pulse signal by integrating a number of consecutive cycles to produce a synthesized Doppler frequency signal having a frequency which is proportional to the velocity of the target vehicle;

dividing means interconnected between said comparator means and said controller means for dividing down the frequency of said pulse signal;

multiplier means interconnected between said controller means and said bandpass filter means for multiplying the frequency of said synthesized Doppler signal;

said multiplier means being formed of a phased-locked loop and counter means for generating said synthesized Doppler signal having a frequency which is a multiple of the center frequency of said bandpass filter means; and said bandpass filter means being responsive to said synthesized Doppler frequency signal for varying the center frequency thereof to track the difference Doppler signal.

2. A digital phase lock detector as claimed in claim 1, wherein said controller means achieves a lock condition when the number of cycles of said synthesized Doppler frequency signal is within a predetermined number of cycles of the difference Doppler signal.

3. A digital phase lock detector as claimed in claim 1, wherein said controller means scans through a period range of frequency and locks onto the strongest component by comparing the difference between successive periods through a period of time.

4. A digital phase lock detector as claimed in claim 1, further comprising crystal-controlled oscillator operatively connected to said controller means for generating a fixed clock signal for use in calculating the period of consecutive cycles.

5. A digital phase lock detector as claimed in claim 4, wherein said fixed clock signal is operated at 2 MHz.

6. A digital phase lock detector as claimed in claim 1, further comprising display means operatively connected and being controlled by said controller means for displaying visually the speed of said target vehicle.

7. A digital phase lock detector as claimed in claim 1, said detector means including turnstile duplexer means for radiating a beam of microwave energy to illuminate the target vehicle, for receiving Doppler shift microwave energy reflected from the target vehicle, and for detecting the reflected Doppler shift microwave energy to develop said difference Doppler signal.

8. A method for determining the speed of a target vehicle utilizing a digital phase lock detector, said method comprising the steps of:

generating a periodic signal having a first frequency which is varied in accordance with the velocity of the target vehicle in response to the difference Doppler signal;

generating a rectangular pulse signal which is a digital representation of the periodic signal in response thereto;

determining the period of the pulse signal by integrating a number of consecutive cycles to produce a synthesized Doppler frequency signal having a frequency which is proportional to the velocity of the target vehicle;

dividing down the frequency of the pulse signal;

multiplying the frequency of the synthesized Doppler signal to produce a second frequency which is a multiple of the first frequency; and varying the first frequency so as to track the difference Doppler signal in response to the synthesized Doppler frequency signal.

9. A method as claimed in claim 8, further including the step of scanning through a predetermined range of frequencies and locking onto the strongest component by comparing the difference between successive periods over a period of time.

10. A method as claimed in claim 8, further comprising the step of displaying visually the speed of the target vehicle.

* * * * *